United States Patent [19]

Sweedler

[11] Patent Number: 5,307,301
[45] Date of Patent: Apr. 26, 1994

[54] FLOATING POINT SAFE INSTRUCTION RECOGNITION METHOD

[75] Inventor: Jonathan B. Sweedler, Sunnyvale, Calif.

[73] Assignee: Intel Corporation, Santa Clara, Calif.

[21] Appl. No.: 46,642

[22] Filed: Apr. 13, 1993

Related U.S. Application Data

[62] Division of Ser. No. 896,424, Jun. 10, 1992.

[51] Int. Cl.$^5$ ............................................. G06F 7/38
[52] U.S. Cl. ....................................... 364/748; 364/745
[58] Field of Search ............ 364/748, 745, 737, 715.06

[56] References Cited

U.S. PATENT DOCUMENTS

| | | |
|---|---|---|
| 4,773,035 | 9/1988 | Lee et al. |
| 4,788,655 | 11/1988 | Nakayama et al. |
| 4,879,676 | 11/1989 | Hansen ............................ 364/748 |
| 5,038,313 | 8/1991 | Kojima ............................ 364/748 X |
| 5,111,421 | 5/1992 | Molnar et al. ................... 364/748 |

Primary Examiner—Tan V. Mai
Attorney, Agent, or Firm—Blakely Sokoloff Taylor & Zafman

[57] ABSTRACT

A safe instruction recognition method and apparatus for use in a pipelined floating-point processor is described. It is based on the examination of the exponents of each operand. A simple symmetric test, applicable to each exponent, is disclosed using the same fixed upper and lower limits. A parallel safe instruction recognition network is described that allows the simultaneous testing of both operand exponent lower and upper limits. All operands declared safe by this method ensure against floating-point processor overflow and underflow exceptions for add, subtract, multiply and divide operations.

7 Claims, 10 Drawing Sheets

FLOATING POINT SAFE INSTRUCTION RECOGNITION METHOD

This is a divisional of application Ser. No. 07/896,424, filed Jun. 10, 1992.

FIELD OF INVENTION

This invention pertains to the field of floating-point processor control and more specifically to the control and regulation of a floating-point pipeline in response to an arithmetic instruction causing an exception.

BACKGROUND TO THE INVENTION

Floating-point instructions have a much longer latency than integer instructions. This creates a problem because certain floating-point exceptions can only occur after the instruction has completed. If an unmasked exception is generated by a floating-point instruction, a fault must occur immediately before the next "wait" instruction or non-control type floating-point instruction. Because of the pipelined implementation of some floating-point units (FPUs), and because instructions can be executed in parallel with other instructions in a superscalar machine, the next instruction might already have been executed. Thus, by the time the exception were known, it would be too late to signal a fault. To avoid this situation, safe instruction recognition (SIR) may be implemented in the FPU. SIR works on the premise that safe instructions (instructions that do not have to jump to the internal micro-code exception handler to complete) can be recognized quickly and easily before the entire operation has completed. If an instruction is unsafe, that means it might, or might not cause an internal exception. This final determination can only be made after the operation has completed. If an instruction is unsafe, then the pipeline must be stalled until this final determination can be made. However, if the instruction is found to be safe (which is the usual case) then no stall is needed and the full performance of the pipeline is realized.

The present invention provides for the rapid and efficient detection of unsafe conditions that could lead to abnormal operation of the floating-point processor when executing add, subtract, multiply or divide operations.

SUMMARY OF THE INVENTION

A method and apparatus is described for testing floating-point operands prior to processing in a pipelined floating point processor in order to determine if the intended arithmetic process is safe from overflow and underflow exceptions. The determination is made by a logic network that operates only on the two operand exponents and by a set of predetermined conditions that the exponents must satisfy for safe instruction recognition (SIR). In its simplest form one preferred embodiment establishes a symmetric uncoupled and independent test for each operand exponent using one pair of limit comparators for checking that the exponent falls within a prescribed safe range. If both exponents test affirmatively, the intended arithmetic operation is declared safe.

DETAILED DESCRIPTION OF THE INVENTION

The effective processing speed of floating-point (f-p) processors may be enhanced by the use of a pipeline structure. This technique decomposes the process of instruction execution within the processor into subprocesses that can be executed concurrently in an overlapping manner. Instruction execution consists of several sequential steps that can be executed relatively independently of each other. These steps may include:

1) prefetch (PF)
2) preliminary instruction decode (D1)
3) instruction decode (D2)
4) fetch operands (E)
5) execute stage 1 (X1)
6) execute stage 2 (X2)
7) output result (WF)
8) update status/errors (ER)

Because the FPU hardware is not active during the PF and D1 stages, only the last six stages need be considered in the context of the present invention.

Figure 1:
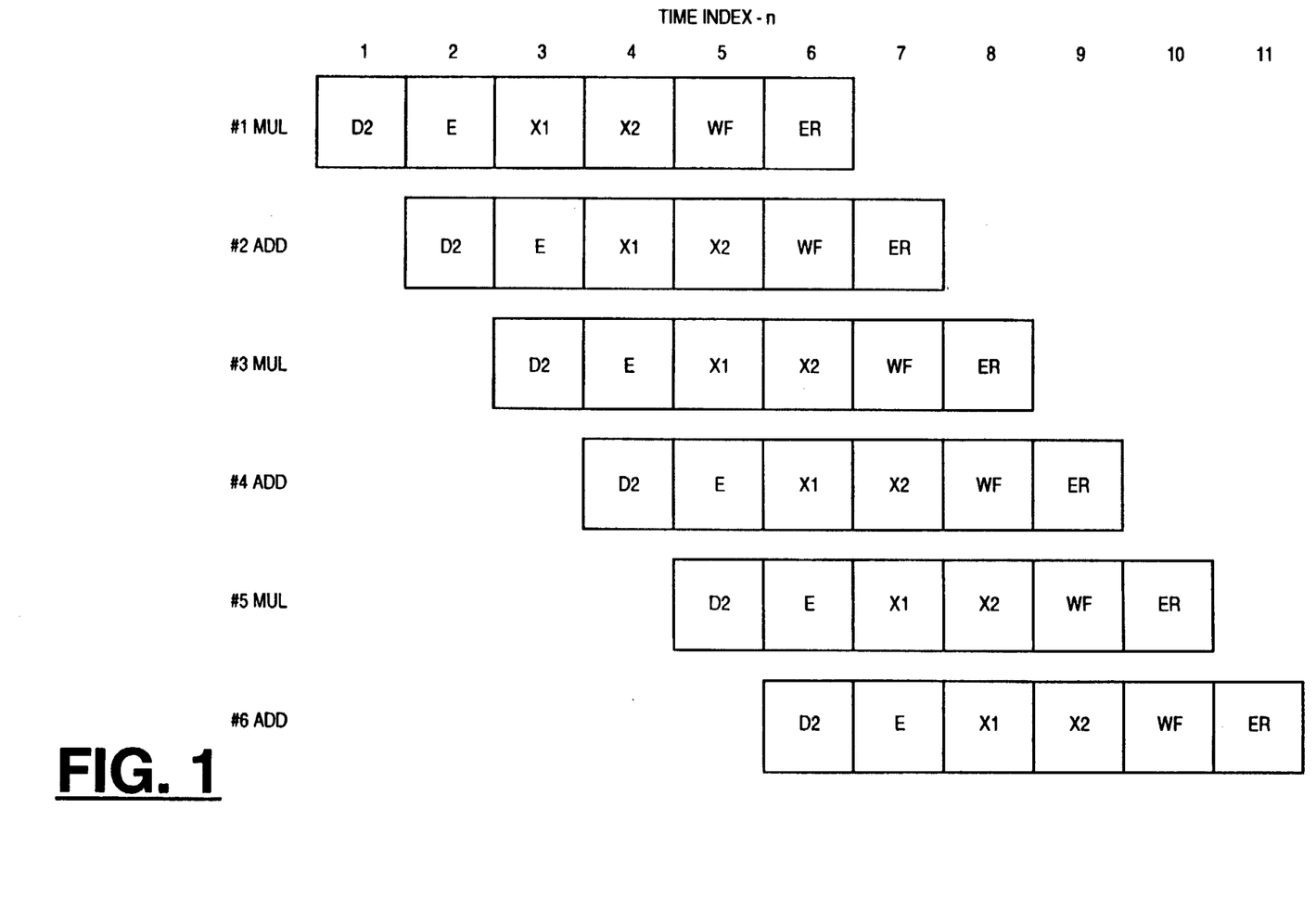
FIG. 1 shows the relative timing of a floating-point pipeline.

The essential process steps are shown graphically in FIG. 1 for the case where a multiply (MUL) operation is followed by an add (ADD) operation. Each step is executed at uniform time intervals as indicated by the time index, n. At time index n=1, processing of instruction 1 (MUL) begins. Upon completion of instruction decode (D2), operand fetch (E) takes place, permitting the pipeline resources required for instruction decode (D2) to begin operations on the second instruction (ADD). Both E for MUL and D2 for ADD are being processed simultaneously. By time index n=6 all pipe stages are full (ER, WF, X2, X1, E and D2) corresponding to six different subprocesses operating on instructions 1 through 6, respectively. Thus, once the pipeline is filled, all subprocesses are in operation simultaneously producing a processed output at each time index interval, effecting, in this example, a six to one speed-up over non-pipelined operation. However, the full gain in throughput of the pipelined processor is achieved only when the process flow is uninterrupted.

If an exception were to be generated during any of the pipeline stages, the smooth flow would be interrupted. An exception on a given instruction must be caught before the completion of the E stage of the next instruction. For example, if instruction #1 (MUL) causes an exception, instruction #2 (ADD) must not go beyond its E stage. However, all exceptions on the MUL instruction are not known unitl the ER stage. Thus, the ADD instruction would have to stall in the E stage until the MUL reached the ER stage even when there were no exceptions on the MUL.

To avoid this difficulty, a timely warning of a possible exception must be provided by implementing a safe instruction recognition (SIR) capability that pre-screens the operands.

SIR works on the premise that safe instructions can be recognized quickly and easily before the entire operation is completed. An instruction is deemed "safe" if it does not require a jump to an external exception handler in order to complete (i.e., it will not have an exception). If an instruction is "unsafe", it may or may not cause an exception. This final determination can only be made, in most practical cases, after the operation has completed. Consequently, an unsafe instruction will cause the pipeline to be stalled until the final determination of an exception is made. However, this stall need only happen for unsafe instructions.

If the MUL instruction has an exception, the following ADD should not be executed because once an instruction passes the E stage, there is no way to prevent its completion. Unfortunately, it is not known for sure if the MUL has an exception until the ER stage. Fortunately, however, it is sometimes possible to determine that an exception is impossible before an arithmetic ADD, SUB, MUL or DIV is executed. The timely detection of the impossibility of an exception for a given instruction would allow the next instruction to continue before the completion of the given instruction.

If a given instruction can not be certified as impossible to cause an exception, it is declared to be unsafe. This causes the execution of the next instruction to stall until the unsafe instruction is executed and declared safe /r found to have an exception.

Figure 2:
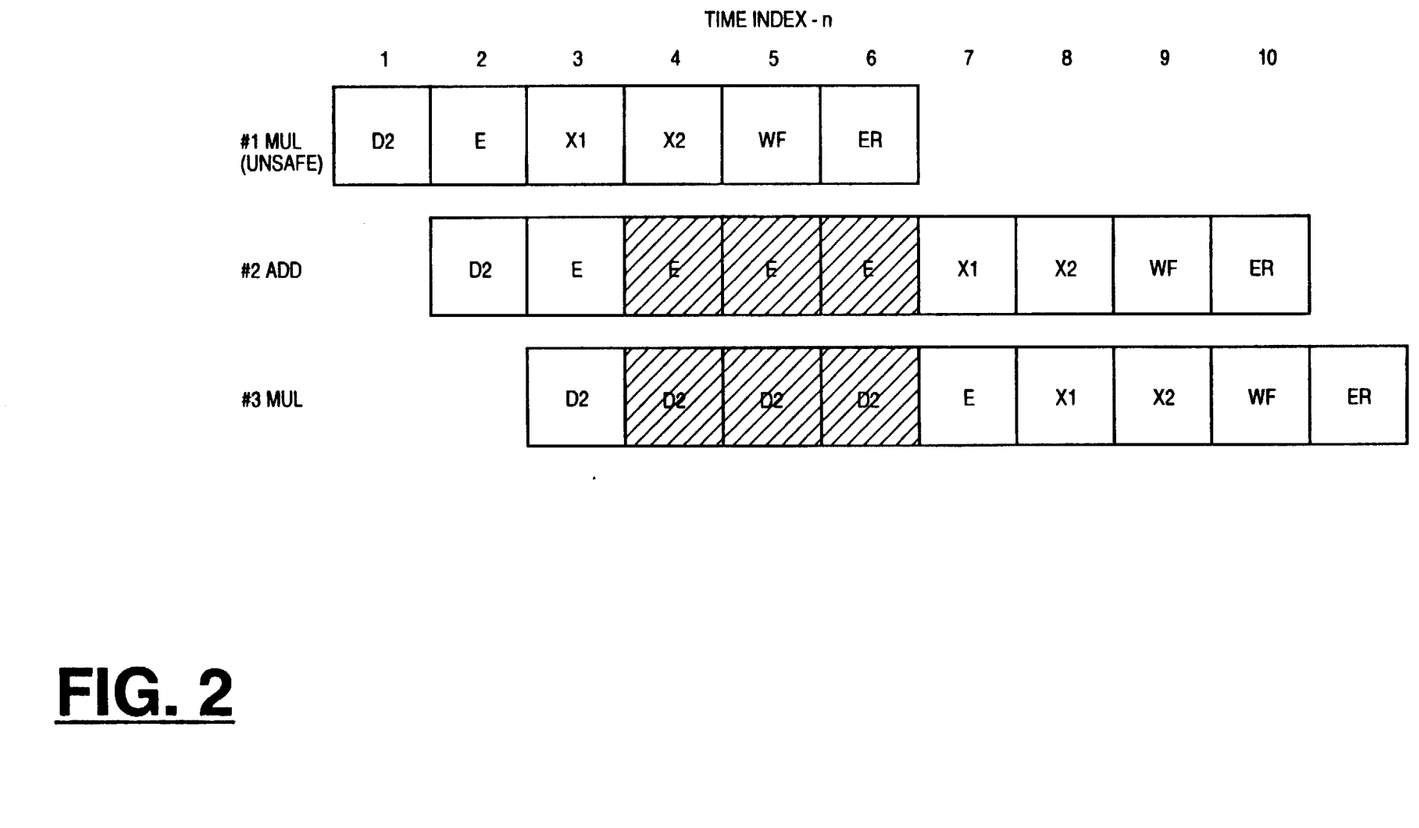
FIG. 2 shows the effect of an unsafe instruction on pipeline flow.

FIG. 2 depicts an example in which the MUL instruction is declared to be unsafe in its X1 stage. As a consequence the pipeline controller stalls the completion of ADD in the E stage until the MUL instruction completes through the ER stage. The result is a three cycle delay as indicated by the shaded blocks. SIR operates during the X1 stage.

Unsafe instructions result from specific sets of operand values. Most operands can be expected to result in safe operations. The determination of unsafe operands for specific arithmetic operations are best understood by examining the structure of floating-point numbers.

A floating point number, X, is representable by the following expression:

$$X = (-1)^s \cdot 2^{e-b} \cdot (1.f)$$

where
s is the sign bit;
e is the biased exponent;
b is the exponent bias required to keep the biased exponent, e, positive (different for each precision); and
f is the fraction after the binary point.

For single and double precision, this number is typically represented in storage by the bit string To perform arithmetic operations on numbers stored in the above format, the processor will generally unpack the bit strings into their component sign (S), exponent (e) and fraction (f) with the implicit leading 1 (1.f). Thus, the significant bit field represents a bounded value $1 \leq 1.f < 2$ for all non-zero numbers. The value of zero is represented by $e=0$ and $f=0$. Other conventions include reserving extreme values, such as $e=0$ and $e=e_{max}=111\ldots1$ to designate special operands.

Floating-point number representations are further classified by the number of bits in the exponent (e) and fraction (f) field. Table I summarizes the format parameters for several IEEE standard binary floating point formats (ANSI/IEEE Std. 754-1985).

TABLE I

| | FORMAT | | | |
|---|---|---|---|---|
| Parameter | Single | Single Extended | Double | Double Extended |
| p-precision bits | 24 | ≧32 | 53 | ≧64 |
| $E_{max}$ - max. expo. | +127 | ≧+1023 | +1023 | ≧+16383 |
| $E_{min}$ - min. expo. | −126 | ≦−1022 | −1022 | ≦−16382 |
| E exponential bias | +127 | ** | +1023 | ** |
| E width in bits | 8 | ≧11 | 11 | =15 |
| Format width-bits | 32 | ≧43 | 64 | ≧79 |

**unspecified

Figure 3A:
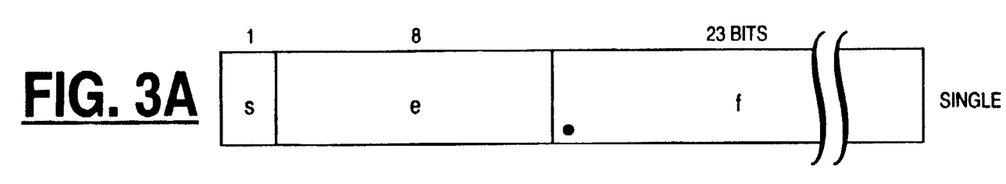
FIGS. 3a-3d show the different floating point number formats.
Figure 3B:
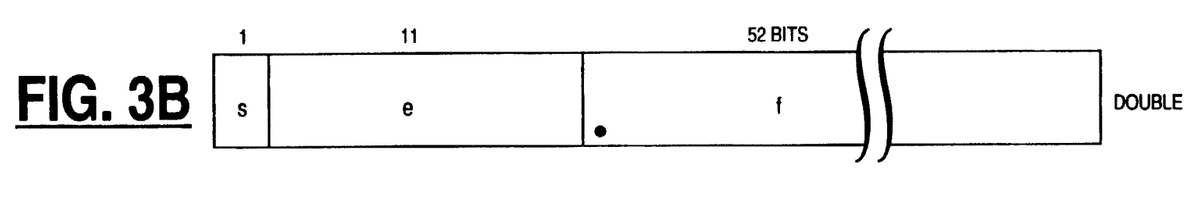
Figure 3C:
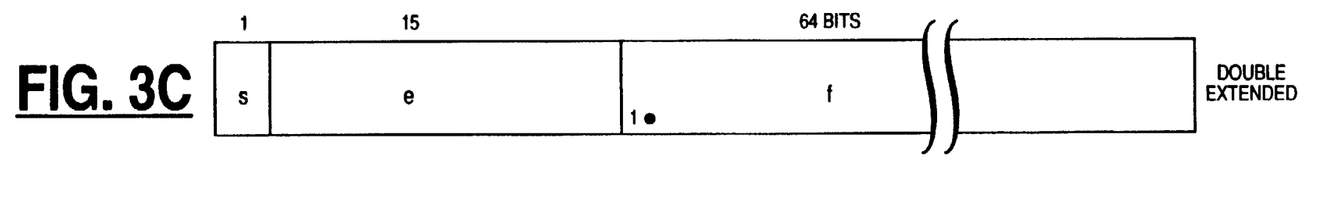
Figure 3D:
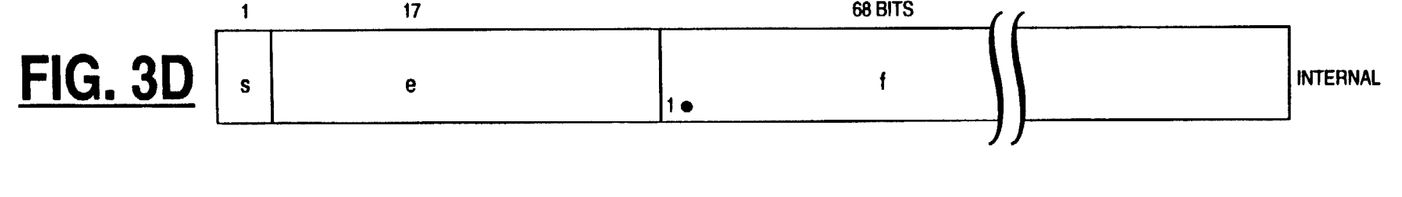

These formats, having gained industry-wide acceptance, will be used to describe the preferred embodiments of the current invention. FIGS. 3a-3d are further clarification of the formats defined by Table 1. FIGS. 3a through 3c represent bit strings for single, double, and double extended formats as specified in Table 1. FIG. 3d represents the internal format used in a preferred embodiment of the invention.

There are six possible exceptional conditions that the floating-point processor must address:

1) Denormal—floating point operand(s) not in normalized format;
2) Invalid operation—operand is invalid for operation to be performed, e.g., subtract like signed infinites;
3) Divide by zero—divisor is zero and dividend is finite;
4) Overflow—destination format's largest finite number is exceeded in magnitude by what would have been the rounded result were the exponent range unbounded;
5) Underflow—arithmetic result with magnitude less than $2^{E_{min}}$ or extraordinary loss of accuracy due to denormalization.
6) Inexact—rounded arithmetic result is not exact or if it /verflows without an overflow trap.

The first three exceptions are pre-operation exceptions because they can be signalled before the operation takes place. They can be detected in the X1 stage in time to abort the execution of the instruction in E. Consequently, they are not a problem. The last three exceptions can only be definitely determined after the operation in the ER stage is complete. However, an early indication of the livelihood of overflow or underflow exceptions can be made before the operation begins by examining the exponents of the two operands as will be described for the preferred embodiments of the invention.

The early prediction of the likelihood of an inexact exception cannot be readily made and hence is not within the scope of the invention. However, if the inexact exception is masked all floating-point operations are declared inexact-safe. If unmasked, the same arithmetic result obtains but the operation is declared unsafe causing stall cycles to be introduced in the pipeline.

Because of the relatively larger range of magnitude of the exponential term ($2^{e-b}$) versus the range of the significand (1. f), the overflow and underflow conditions are dominated by the values of the exponent. For example, if the unbiased exponents of both operands are 0, then no arithmetic operation can result in an underflow or overflow exception regardless of the value of the mantissa.

In the preferred embodiment of the invention, the internal registers of the floating-point processor store all floating-point numbers in internal precision. However, overflow and underflow are always checked with extended precision limits. So, even though the precision control might be set to single or double precision, the full extended range of extended precision exponents (15 bits) is used as shown in FIG. 3(c). As a result, fewer operands are found to be unsafe. This reduces the number of erroneous exception predictions and thus increases the effective pipeline throughput rate.

In the description that follows, the C language convention for hexadecimal numbers is used. Thus, all numbers with "0×" in front of them are in base 16. All other numbers are in base 10. Floating-point arithmetic operations of add, subtract, multiply and divide will be analyzed for purposes of determining safe underflow/overflow exponent ranges, using the following definitions:

Bias: internal exponent bias equal to $0 \times FFFF$;
$E_1$, $E_2$: internal precision biased exponents for operands 1 and 2, respectively;
$E_{diff}$: absolute value of exponent difference;
$E_{greater}$: greater of $E_1$ and $E_2$;
$E_{max}$: largest possible biased exponent equal to $0 \times 13FFE$;
$E_{min}$: smallest biased exponent equal to $0 \times C001$; and
p: precision of mantissa (1.f) in bits and is equal to $0 \times 40$.

Consider the floating-point operation of true add which is defined as the addition of two numbers with like signs or the subtraction of two numbers with opposite sign. Because the destination precision can be smaller than the source precision, two mantissa overflows may occur: The first due to the addition of two numbers with equal exponents ($E_1 = E_2$) and maximum value significands (1.f=1.1111111); and a subsequent second rounding to lower precision causing a rounding bit to ripple through into the next highest bit position (11.11 . . . 11+0.00 . . . 01 = 100.00 . . . 00). Consequently, the resulting exponent, after normalizing the mantissa, must be increased by two. Hence, overflow is impossible if $$E_{greater} + 2 \leq E_{max}$$

This condition may be satisfied by requiring $$E_1, E_2 \leq 0 \times 13FFC$$

True subtraction is defined as the addition of two numbers with opposite signs or the subtraction of two numbers with the like sign. Unlike true addition both overflow and underflow can occur. However, in the case of overflow only single mantissa overflow is possible. Thus, overflow is impossible if $$E_{greater} + 1 \leq E_{max}$$

This condition may be satisfied by requiring $$E_1, E_2 \leq 0 \times 13FFD$$

Underflow may occur under two different conditions. The first condition obtains when $E_{diff} > 1$. The maximum normalization of the resulting mantissa is a left shift of one, thus requiring the pre-normalized resulting exponent to be decremented by one. Hence, underflow is impossible, under these conditions, if $$E_{greater} - 1 \geq E_{min}$$

$$E_{greater} \geq E_{min} + 1$$

$$E_{greater} \geq 0 \times C002$$

This condition may be satisfied by checking to see that $$E_1, E_2 \geq 0 \times C002$$

The second condition obtains when $E_{diff} \leq 1$, requiring a maximum left shift normalization of p positions to the left. Thus, underflow is impossible if $$E_{greater} - p \geq E_{min}$$

$$E_{greater} \geq E_{min} + p$$

or $$E_{greater} \geq 0 \times C041$$

which may be satisfied by checking that $$E_1, E_2 \geq 0 \times C041$$

Because the second condition is more stringent, it may be desirable to simplify the true subtraction underflow by using the latter requirement ($E_1, E_2 \geq 0 \times C041$).

The multiply operation may result in either overflow or underflow. Double mantissa overflow, being possible, imposes the requirement that $$E_1 + E_2 - Bias + 2 \leq E_{max}$$

$$E_1 + E_2 \leq E_{max} + Bias - 2$$

or $$E_1 + E_2 \leq 0 \times 23FFB.$$

Underflow is impossible if $$E_1 + E_2 - Bias \geq E_{min}$$

$$E_1 + E_2 \geq E_{min} + Bias$$

or $$E_1 + E_2 \geq 0 \times 1C000.$$

Division can result in a single mantissa overflow which can be prevented if $$E_1 - E_2 + Bias + 1 \leq E_{max}$$

$$E_1 - E_2 \leq E_{max} - Bias - 1$$

or $$E_1 - E_2 \leq 0 \times 3FFE$$

where $E_1$ and $E_2$ are the dividend and divsor exponents, respectively. Underflow due to division may occur.

Because a single left shift is the maximum normalization required, underflow is impossible if $$E_1 - E_2 + \text{Bias} - 1 \geq E_{min}$$

$$E_1 - E_2 \geq E_{min} - \text{Bias} + 1$$

or $$E_1 - E_2 \geq -0 \times 3\text{FFD}.$$

Table II summarizes the above set of algorithm #1 inequalities. Overflow and underflow are indicated in the exception column as O and U respectively.

TABLE II

| Operation | Exception | $E_1, E_2$ | $E_1 + E_2$ | $E_{diff} = E_1 - E_2$ |
|---|---|---|---|---|
| ADD | O | $\leq E_{max} - 2$ | | |
| SUB | O | $\leq E_{max} - 1$ | | |
| | U | $\geq E_{min} + 1$ | | $> 1$ |
| | U | $\geq E_{min} + p$ | | $\leq 1$ |
| MUL | O | | $\leq E_{max} + \text{Bias} - 2$ | |
| | U | | $\geq E_{min} + \text{Bias}$ | |
| DIV | O | | | $\leq E_{max} - \text{Bias} - 1$ |
| | U | | | $\geq E_{min} - \text{Bias} + 1$ |

Figure 4:
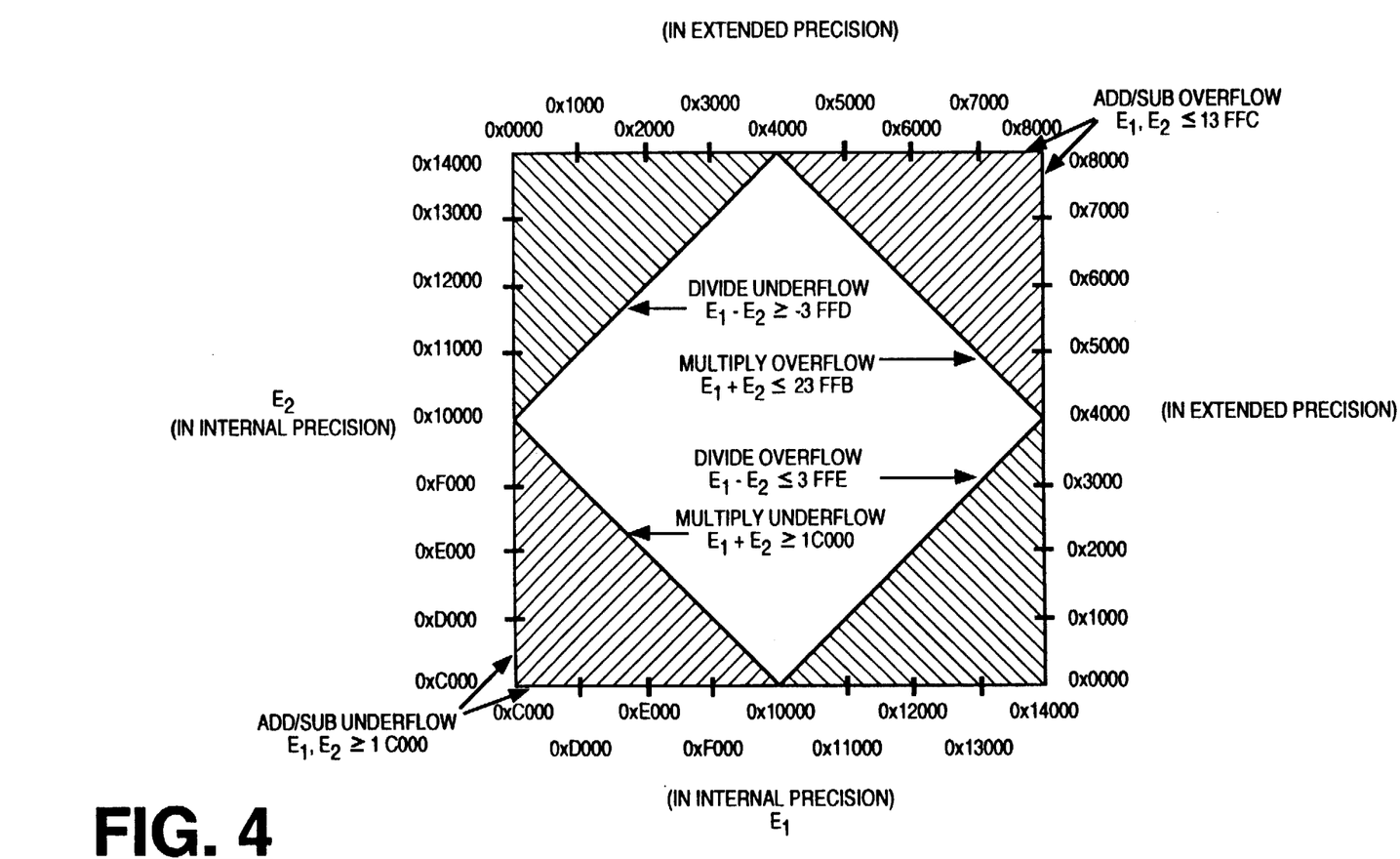
FIG. 4 shows the safe instruction recognition (SIR) limit diagram for algorithm #1.

FIG. 4 roughly graphs the permissible (unshaded) range of operation defined by Table II using the values previously stated. However, because of the excessively large scale required to represent the global range of permissible values of $E_1$ and $E_2$, values like $E_{max} - 1$ and $E_{max}$ are indistinguishable, as is $E_{min} + 1$ and $E_{min} + p$. $E_2$ is plotted as a function of $E_1$ with the left side ordinate marked in terms of internal biased values and the right-side ordinate scaled in external biased extended double precision. Similarly, the bottom abscissa is in internal biased values of E, while the top abscissa is in external biased double precision values.

The unshaded area of FIG. 4 represents the region in which exponent values $E_1$ and $E_2$ are absolutely sure not to produce an overflow or underflow exception for any operation. However, this does not mean that exponential pairs ($E_1$, $E_2$) falling outside this region will, with certainty, produce an overflow /r underflow exception.

Table II clearly indicates that true add and subtract operations require testing to confirm that $E_1$ and $E_2$ each satisfy the appropriate inequality indicated in the $E_1$, $E_2$ column. Multiply operations require the formation of the sum $E_1 + E_2$, a 17 bit add operation which is time consuming. Similarly, divide operations require the formation of the difference $E_1 - E_2$, a 17 bit subtract operation that is also time consuming. As previously mentioned, the additional test conditions for subtract underflow indicated in the $E_{diff}$ column ($E_{diff} \geq 1$, $E_{diff} \leq 1$) may be removed by using the tighter constraint requiring that $E_1$, $E_2 \geq E_{min} + p$.

Because SIR must be done rapidly and addition is an inherently slow /peration in modern digital computers, it may be advantageous to find an exponent check that can be performed separately on $E_1$ and $E_2$ without forming their sum or difference. In other words, devise an exponent check that uncouples exponents $E_1$ and $E_2$.

Reference to FIG. 4 and the previous analysis shows that multiplication and division impose the most stringent constraints everywhere except at the corners of the diamond shaped region of permissible exponent values.

However, these cases are of no consequence as will be shown below.

Referring back to the expression for the multiply overflow exception obtains $$E_1 + E_2 \leq E_{max} + \text{Bias} - 2$$

This condition may be satisfied by requiring that $E_1$ and $E_2$ each be less than one-half the value on the right of the above inequality, or $$E_1, E_2 \leq \tfrac{1}{2}[E_{max} + \text{Bias} - 2]$$

Similarly, the multiply underflow constraint was shown to be $$E_1 + E_2 \geq E_{min} + \text{Bias}$$

so that $$E_1, E_2 \geq \tfrac{1}{2}[E_{min} + \text{Bias}]$$

also satisfies the previous multiply underflow inequality.

The division overflow inequality was shown to be $$E_1 - E_2 \leq E_{max} - \text{Bias} - 1$$

Let the maximum permissible value of $E_1$ be represented by $E_{max}$ less some quantity x, so that $$E_1 = E_{max} - x$$

Similarly, let the minimum value of $E_2$ be equal to the smallest exponent $E_{min}$ plus same quantity $\beta x$ (Recall large dividends and small divisors lead to overflow). Thus, $$E_2 = E_{min} + \beta x$$

Substituting for $E_1$ and $E_2$ in the above overflow inequality obtains $$E_{max} - x - E_{min} - \beta x \leq E_{max} - \text{Vias} - 1$$

$$-x - E_{min} - \beta x \leq -\text{Bias} - 1$$

$$x + \beta x + E_{min} \geq \text{Bias} + 1$$

or $$(1 + \beta)x \geq -[E_{min} - \text{Bias} - 1]$$

so that $$x \geq -\frac{1}{1 + \beta}[E_{min} - \text{Bias} - 1]$$

Hence, $$E_1 = E_{max} - x$$

$$E_1 \leq E_{max} + \frac{1}{1 + \beta}[E_{min} - \text{Bias} - 1]$$

Similarly, it may be shown that $$E_2 = E_{min} + \beta x$$

-continued $$E_2 \geq \frac{1}{1+\beta} [E_{min} + \beta(\text{Bias} + 1)]$$

Thus, the above inequalities for $E_1$ and $E_2$ do not require forming the difference $E_1 - E_2$.

For underflow $E_2 > E_1$, so that a similar type of substitution of variable ($E_1 = E_{min} + \beta x$ and $E_2 = E_{max} - x$) results in the following constraint inequalities:

$$E_1 \geq E_{min} + \frac{\beta}{1+\beta} [E_{max} - \text{Bias} + 1]$$

and $$E_2 \leq \frac{1}{1+\beta} [\beta E_{max} + \text{Bias} - 1]$$

A convenient choice of parameter $\beta$ is $\beta = 1$, resulting in symmetrical constraints and a binary leading fraction for both bracketed terms. The division constraint inequalities for overflow become $$E_1 \leq E_{max} + \tfrac{1}{2}[E_{min} - \text{Bias} - 1]$$

and $$E_2 \geq \tfrac{1}{2}[E_{min} + \text{Bias} + 1]$$

while for division underflow, letting $\beta = 1$, yields $$E_1 \geq E_{min} + \tfrac{1}{2}[E_{max} - \text{Bias} + 1]$$

and $$E_2 \leq \tfrac{1}{2}[E_{max} + \text{Bias} - 1].$$

Table III summarizes the constraint inequalities that apply from the above analysis yielding uncoupled test parameters for $E_1$ and $E_2$.

TABLE III

| Operation | Exception | $E_1$ | $E_2$ |
|---|---|---|---|
| ADD | O | $\leq E_{max} - 2$ | $\leq E_{max} - 2$ |
| SUB | O | $\leq E_{max} - 1$ | $\leq E_{max} - 1$ |
|  | U | $\geq E_{min} + p$ | $\geq E_{min} + p$ |
| MUL | O | $\leq \tfrac{1}{2}[E_{max} + \text{Bias} - 2]$ | $\leq \tfrac{1}{2}[E_{max} + \text{Bias} - 2]$ |
|  | U | $\geq \tfrac{1}{2}[E_{min} + \text{Bias}]$ | $\geq \tfrac{1}{2}[E_{min} + \text{Bias}]$ |
| DIV | O | $\leq E_{max} + \tfrac{1}{2}[E_{min} - \text{Bias} - 1]$ | $\geq \tfrac{1}{2}[E_{min} + \text{Bias} + 1]$ |
|  | U | $\geq E_{min} + \tfrac{1}{2}[E_{max} - \text{Bias} + 1]$ | $\leq \tfrac{1}{2}[E_{max} + \text{Bias} - 1]$ |

Table III may be further simplified by noting that the constraint inequalities are the same for both $E_1$ and $E_2$ for all operations except DIV. Just as the previous choice of $\beta = 1$ introduced symmetry in the constraint inequalities for the MUL operation, symmetry for $E_1$ and $E_2$ can be established by finding a single minimum value and a single maximum that may be applied to testing both $E_1$ and $E_2$. Thus, we require that $E_1$, $E_2$ be equal to or less than the lesser of $E_{max} + \tfrac{1}{2}[E_{min} - \text{Bias} - 1]$ and $\tfrac{1}{2}[E_{max} + \text{Bias} - 1]$. For $$\tfrac{1}{2}[E_{max} + \text{Bias} - 1] < E_{max} + \tfrac{1}{2}[E_{min} - \text{Bias} - 1]$$

to be true, it is required that $$E_{max} + E_{min} > 2 \, \text{Bias}$$

which may be confirmed by substitution of the values previously stated. Therefore, one condition for prevention of DIV overflow is that the upper bound for $E_1$ and $E_2$ must satisfy $$E_1, E_2 \leq \tfrac{1}{2}[E_{max} + \text{Bias} - 1]$$

Similarly, the lower limit may be determined by noting that $$\tfrac{1}{2}[E_{min} + \text{Bias} + 1] < E_{min} + \tfrac{1}{2}[E_{max} - \text{Bias} + 1]$$

if $$E_{max} + E_{min} > 2 * \text{Bias}$$

This latter condition is satisfied by the values previously stated so that the lower limit of both $E_1$ and $E_2$ must satisfy the following:

$$E_1, E_2 \geq E_{min} + \tfrac{1}{2}[E_{max} - \text{Bias} + 1]$$

If different design considerations had led to a different set of values for $E_{max}$, $E_{min}$, and Bias, the choice of upper and lower limits might have been different.

As a result, the symmetric safe instruction recognition test inequalities may be summarized as shown in Table IV below.

TABLE IV

| Operation | Exception | $E_1$, $E_2$ lower limit | $E_1$, $E_2$ upper limit |
|---|---|---|---|
| ADD | O |  | $\leq E_{max} - 2$ |
| SUB | O |  | $\leq E_{max} - 1$ |
|  | U | $\geq E_{min} + p$ |  |
| MUL | O |  | $\leq \tfrac{1}{2}[E_{max} + \text{Bias} - 2]$ |
|  | U | $\geq \tfrac{1}{2}[E_{min} + \text{Bias}]$ |  |
| DIV | O/U |  | $\leq \tfrac{1}{2}[E_{max} + \text{Bias} - 1]$ |
|  | O/U | $\geq E_{min} + \tfrac{1}{2}[E_{max} - \text{Bias} + 1]$ |  |

Note that in the case of the DIV operation, no unique assignment of the type of exception can be assigned. The simplification caused by introducing symmetry in the test constraints has obscured the underlying cause of an exception. But, this is of no consequence because the reason for it being unsafe is not of concern. The only concern is that it is unsafe.

Also, a further simplification has been shown to be effective. This additional simplification involved the replacement of the seven distinct tests enumerated in Table IV by two inequalities, i.e., with the lowest valued upper limit (rounded down)

$$E_1, E_2 \leq \lfloor \frac{1}{2}[E\,\text{max} + \text{Bias} - 2] \rfloor$$

and the highest valued lower limit (rounded up)

$$E_1, E_2 \leq \lceil E\,\text{min} + \frac{1}{2}[E\,\text{max} - \text{Bias} + 1] \rceil$$

Figure 5:
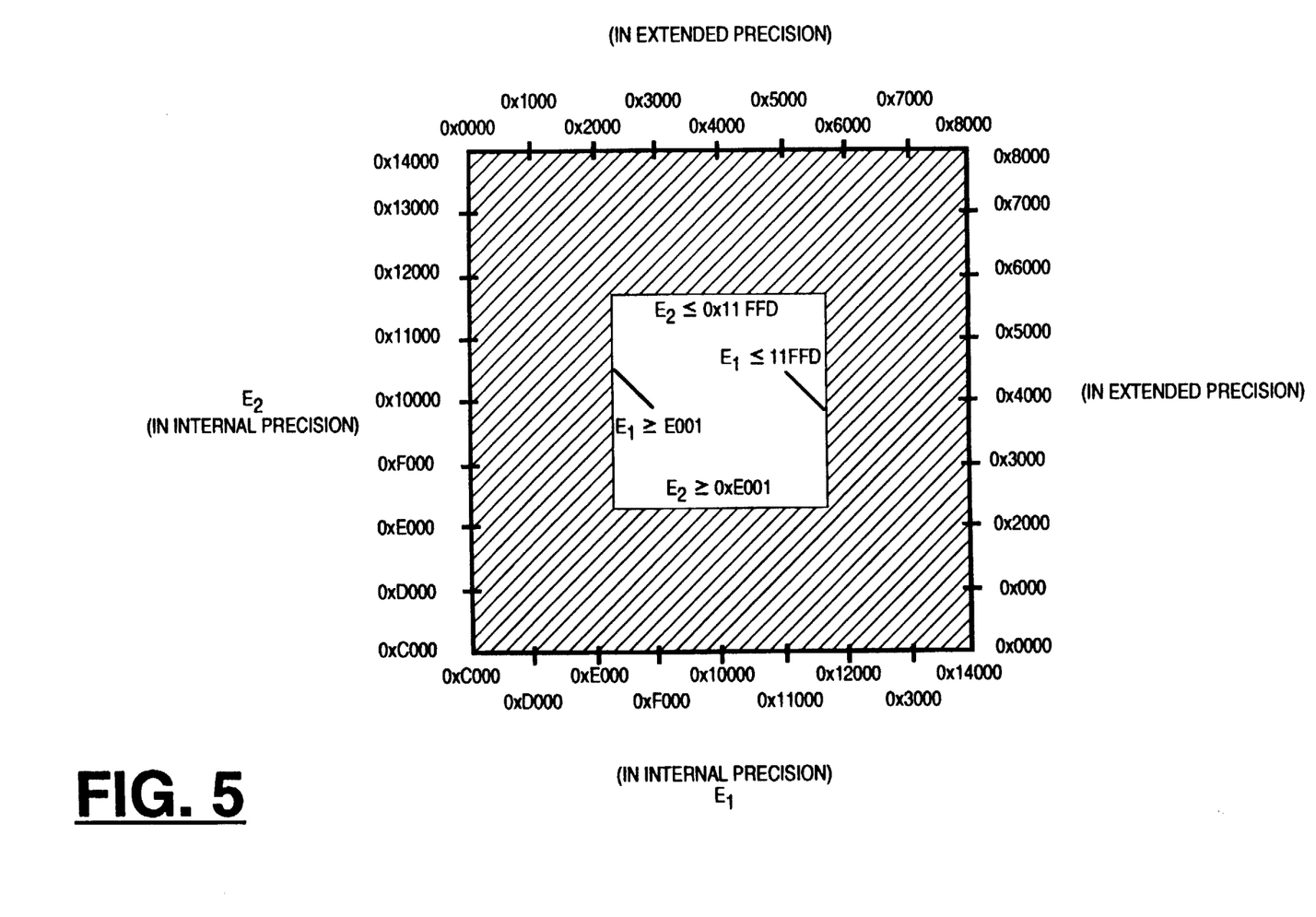
FIG. 5 shows the SIR limit diagram for algorithm #2.

Evaluation of these two limits in terms of the parameters previously given yields 0×E001 for the lower and 0×11FFD for the upper limit, thus defining the same safe operating region indicated in FIG. 5.

In summary, two limits that can be checked independently against $E_1$ and $E_2$ without time consuming addition or subtraction operations have been established.

The effectiveness of this simplification (algorithm #2) has been confirmed by simulations in which the "SPEC"1.0 floating-point benchmarks (doduc, fpppp, matrix300, tomcatv, spice2g6 and nasa7) were analyzed for SIR performance. Of these six programs, doduc was run to completion and the other five were run to approximately 75% completion. ("SPEC" is a tradename for a set of benchmark programs supplied by Waterside Associates, 39510 Paseo Padre Parkway, Suite 300, Fremont, Calif., 94538, U.S.A). No unsafe instructions were found in any programs. The simplifications of algorithm #2 are effective because overflow and underflow are always detected for extended precision and these six programs are double precision (as are most programs today).

Automated safe instruction recognition (SIR) may be implemented by means of a logic network. In the preferred embodiment, the value of $E_1$ or $E_2$ is represented by a 17-bit string. The bit string corresponds to the binary encoded value of the biased exponent, $E_1$ or $E_2$. The binary exponent string is compared to a lower and upper limit to determine if the constraints are met, i.e., the exponent value, $E_1$ or $E_2$, limits determined above. If the limit conditions are met, the logic network output state indicates in the affirmative. Two such networks operating in parallel can simultaneously check $E_1$ and $E_2$.

The comparison of exponent values with prescribed values, selected in accordance with the rules developed in the preceding discussion may be explicit or implicit. Explicit comparison compares the input exponent bit string with an explicity stored value by means of a binary comparator (such as one using cascaded 7485s) whose output is capable of indicating the result of the comparison: less than, equal to, or greater than.

Figure 6:
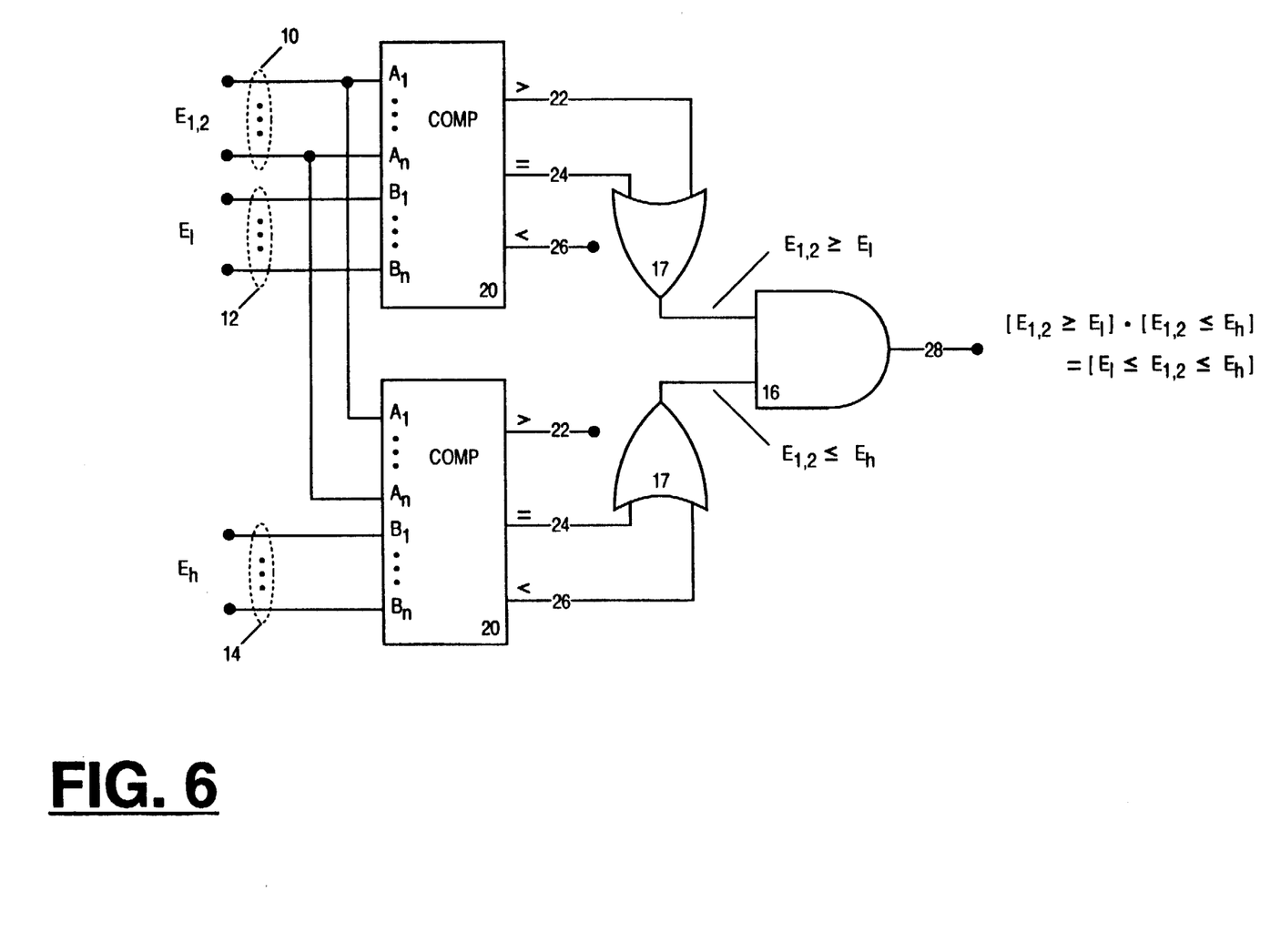
FIG. 6 shows a comparator network for checking the high and low range of an exponent.

FIG. 6 shows a SIR network comprising input lines 10 for accepting the n-bit binary exponent $E_{1,2}$ ($E_1$ or $E_2$), input lines 12 and 14 for accepting the explicit binary bit patterns corresponding to the lower limit, $E_l$, and the upper limit $E_h$, respectively. These experimental values are compared by comparators 20, the upper comparator indicating the outcome of the test $E_{1,2} \geq E_l$ on output terminals 22 and 24. Terminals 22 and 24 are ORed by gates 17. Similarly, the lower comparator 20 produces the result of the test $E_{1,2} \leq E_h$ on terminals 24 and 26 which are also ORed. The ORed outputs of both comparators are fed to AND gate 16 that produces at its output the logical quantity $$[E_l \leq E_{1,2} \leq E_h] = [E_{1,2} \leq E_h] \cdot [E_{1,2} \geq E_l].$$

Figure 7:
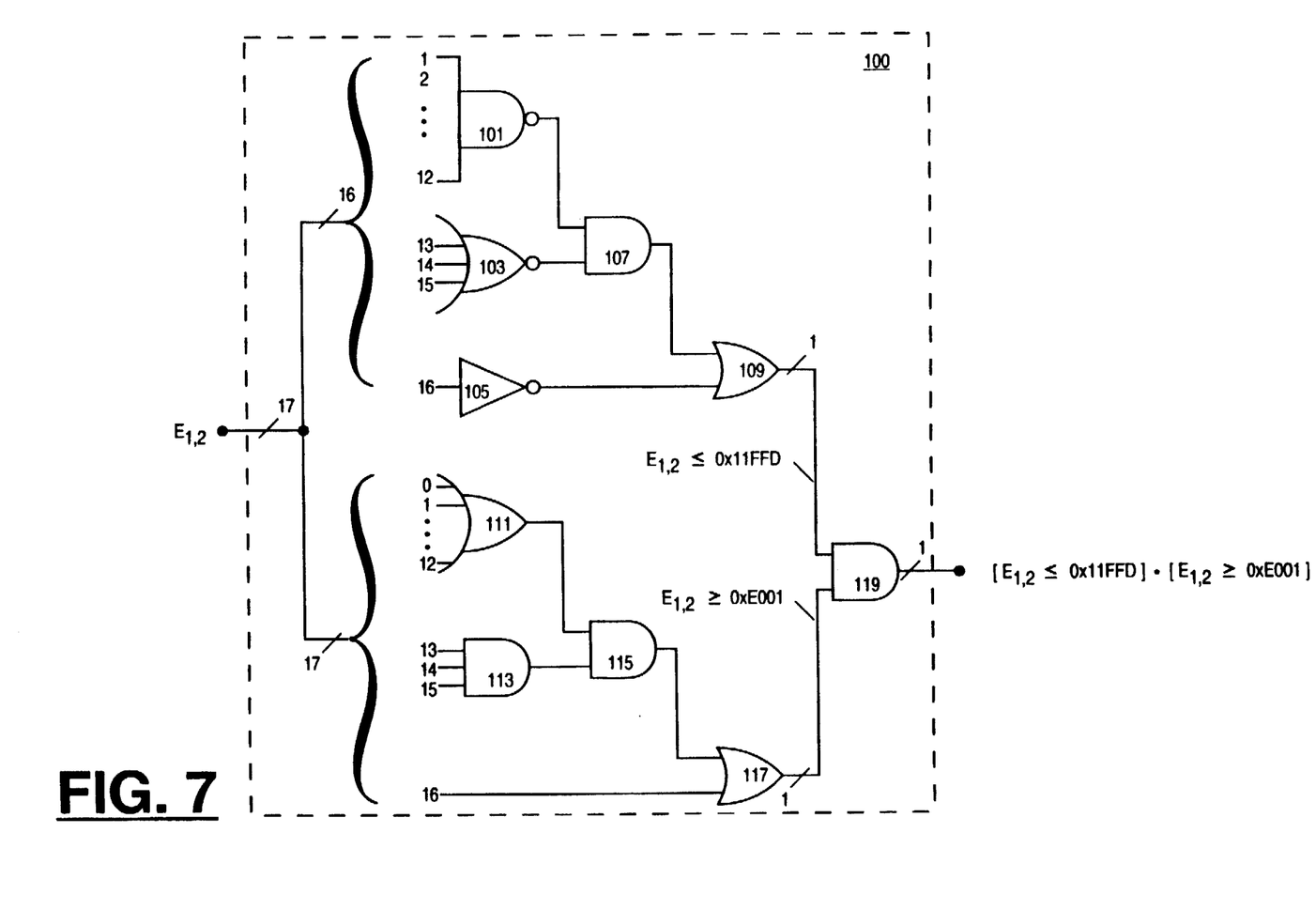
FIG. 7 is a logic network using implicit limit logic for checking the high and low range of an exponent.

FIG. 7 is an example of an embodiment for an implicit comparator 100 that is functionally equivalent to the network of FIG. 6 except that whereas the comparators of FIG. 6 may readily change the exponent constraints by supplying new values of $E_l$ and $E_h$, the logic network 100 of FIG. 7 has $E_l = 0 \times E001$ and $E_h = 0 \times 11FFD$ embedded within the circuit logic. This reduced flexibility can lead to simpler and faster implementations for applications with fixed SIR constraints.

Figure 8:
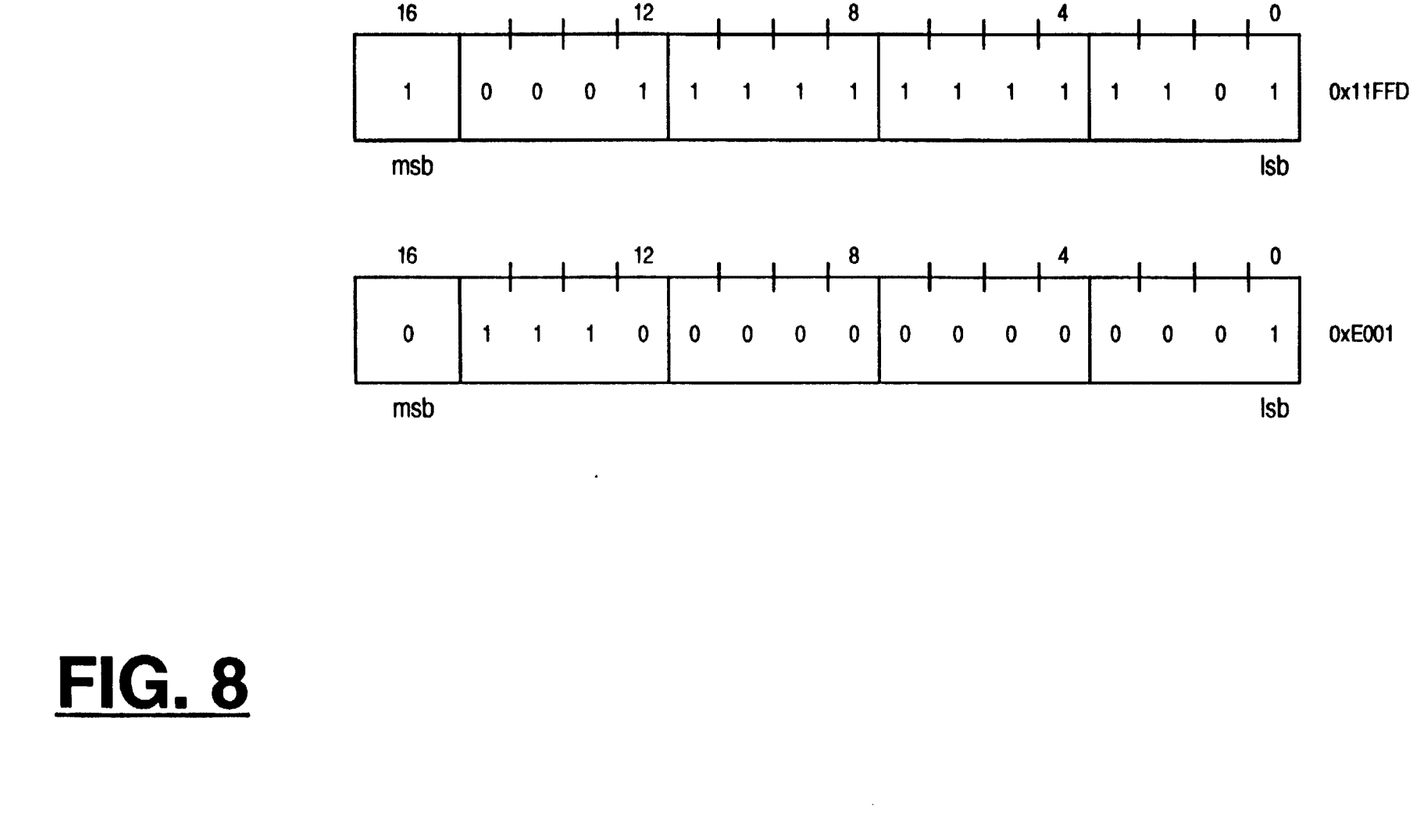
FIG. 8 shows the high and low level bit strings.

Operation of network 100 of FIG. 7 may be understood by considering the exponent bit string corresponding to upper limit 0×11FFD, and to lower limit 0×E001, as shown in FIG. 8. Both bit strings represent a biased exponent, i.e., a positive binary integer.

The purpose of the upper portion of network 100 comprising NAND-gate 101, NOR-gate 103, inverter 105, and AND-gate 107 and OR-gate 109 is to determine if the 17-bit input exponent, $E_{1,2}$, is $\leq 0 \times 11FFD$, as indicated by the output of OR-gate 109 being high.

If bit 16 is low, inverter 105 output is high causing OR-gate output to be high independent of the other input (means $E_{1,2} \leq 0 \times 10000$). If bit 16 is high (means $E_{1,2} \geq 0 \times 10000$), inverter 105 output is low thus requiring the input from AND-gate 107 to be high in order for OR-gate 109 output to be high.

If either bits 13, 14, or 15 are high, NOR-gate 103 low output is applied to AND-gate 107 causing its output to go low, which causes OR-gate 109 output low unless bit 16 is low. If bits 13, 14 and 15 are low, then $E_{1,2} \leq 0 \times 11FFF$.

If any bit 1 through 12 is low, its value must be equal to or less than the value of bits 1 through 12 of 0×11FFD shown in FIG. 8, causing NAND-gate 101 output to go high.

If both NOR-gate 103 and NAND-gate 101 outputs are high, AND-gate 107 output is high indicating that $E_{1,2} \leq 0 \times 11FFD$ regardless of whether bit 16 is high or low.

Bit 0 is not required for the proper determination of $\leq 0 \times 11FFD$ because if it is high, all of the other conditions described above must be satisfied. If it is low, it is of no consequence if all of the conditions are met.

The lower portion of network 100 comprising OR-gate 111 and 117, AND-gates 113 and 115 is used to test if the lower limit constraint, $E_{1,2} \geq 0 \times E001$, is satisfied by the input exponent $E_{1,2}$ by asserting a high at the output /f OR-gate 117.

Bit 16 is applied to one input of OR-gate 117 ensuring a high output if bit 16 is high ($E_{1,2} \geq 0 \times 10000$).

Bits 13-15 are applied to AND-gate 113 causing its output to be high only if all three bits are high ($E_{1,2} \geq 0 \times E000$).

Bits 0-12 are applied to OR-gate 111 causing its output to be high if any of these 13-bits are high. Thus, AND-gate 115 output is high only if bits 13-15 are high and at least one bit of bits 0-12 are high ($E_{1,2} \geq 0 \times E001$).

Therefore, the output of OR-gate 117 is high, indicating that $E_{1,2} \geq 0 \times E001$, if bit 16 and/or bits 13-15 are all high and at least one lower bit (0-12) is high.

The outputs from OR-gate 109 of the upper portion and 117 of the lower portion are logically combined by AND-gate 119 to produce the output variable [0×E001 $\leq E_{1,2} \leq 0 \times 11FFD$].

Figure 9:
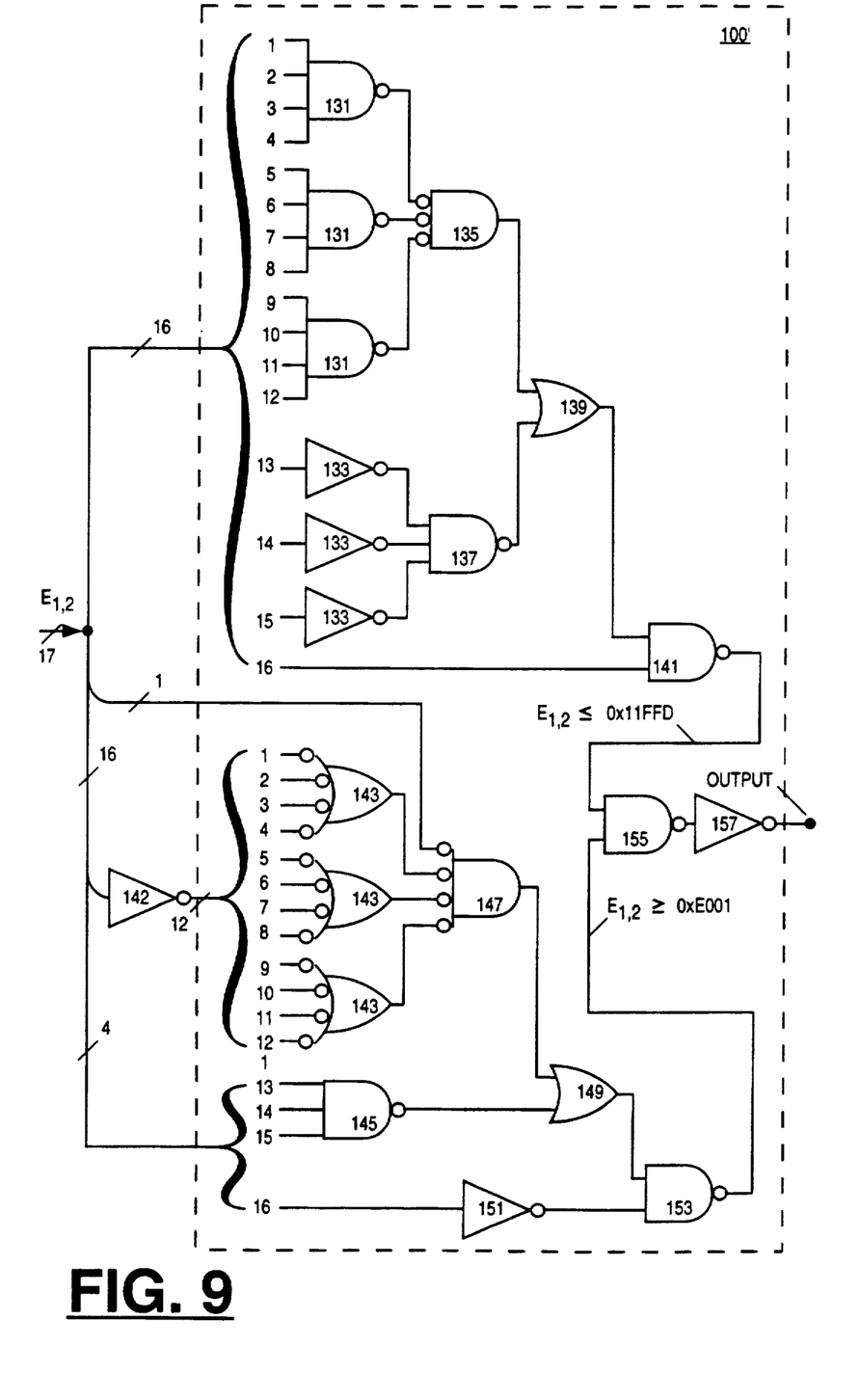
FIG. 9 is another embodiment of an exponent limit testing network.

Network 100' of FIG. 9 is the functional equivalent of network 100 of FIG. 7. FIG. 9 was deemed more suited for integrated circuit manufacture. The upper portion of the network comprising four 4-input NAND-gates 131, one 3-input NAND-gate 137, one 2-input NAND-gate 141, three inverters 133, one 3-input NOR-gate 135, and OR-gate 139, produces at the output of NAND-gate 141 the variable $E_{1,2} \leq 0 \times 11FFD$. The lower portion of network 100', comprising three 4-input NAND-gates 143, one 4-input NOR-gate 147, one 2-input OR-gate 149, one 3-input NAND-gate 145, inverter 151, and output NAND-gate 153, produces at the output of NAND-gate 153 the variable $E_{1,2} \geq 0 \times E001$. Inverter 142 is a 12-channel inverter network inverting lines 1-12. The upper and lower output variables are combined by NAND-gate 155 in conjunction with output inverter 159 to form the output variable $[0 \times E001 \leq E_{1,2} \leq 0 \times 11FFD]$.

Figure 10:
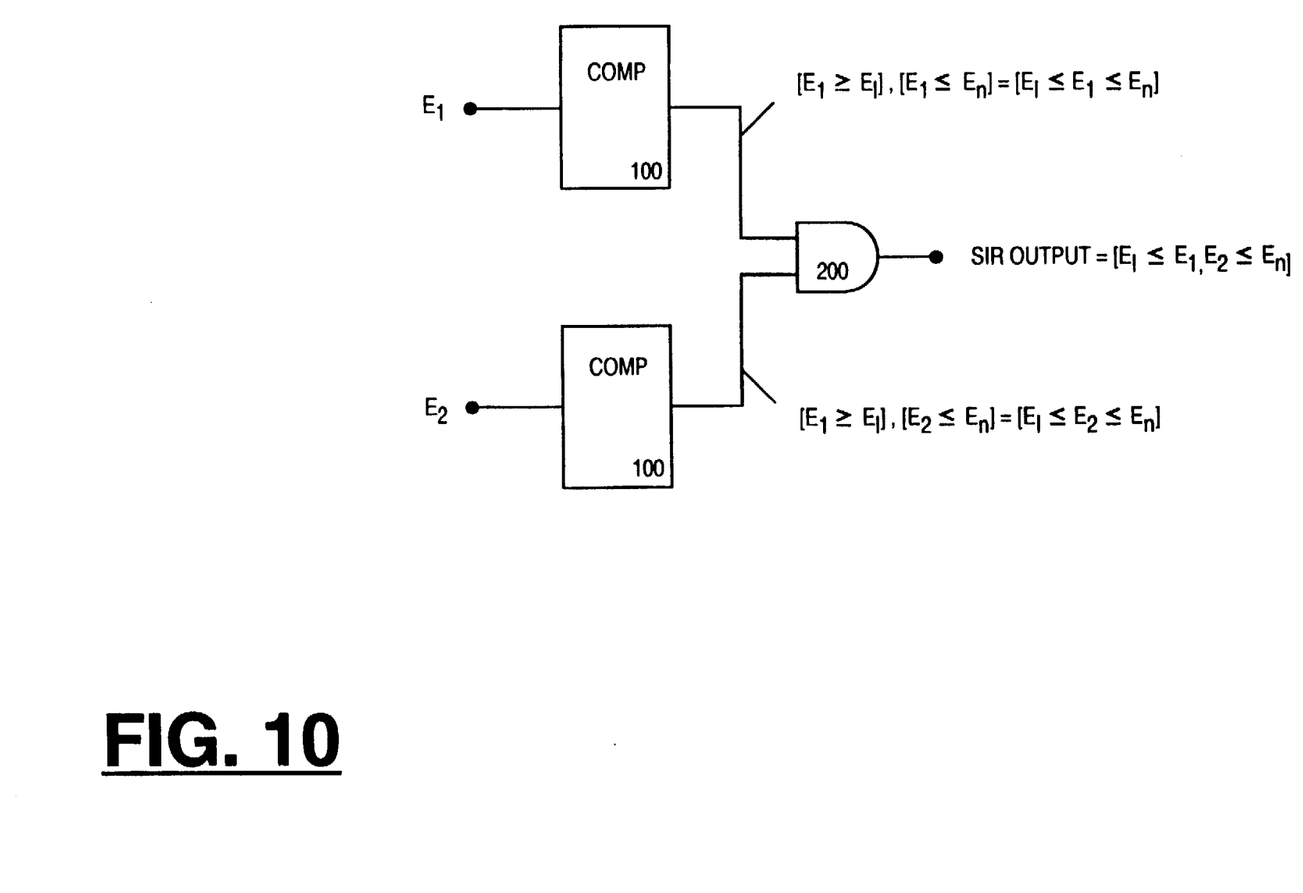
FIG. 10 is a block diagram of a complete SIR variable generator network.

FIG. 10 shows a complete SIR network comprising two comparator 100 networks as shown in FIGS. 7 or 9 and AND-gate 200 combining the output of each comparator. The comparator accepting $E_1$ as its input produces the output variable $[E_l \leq E_1 \leq E_h]$ while the other produces output variable $[E_l \leq E_2 \leq E_h]$ using input $E_2$. The output from AND-gate 200 produces the SIR variable, $[E_l \leq (E_1, E_2) \leq E_h]$ which is high when both $E_1$ and $E_2$ are within the acceptable safe range.

What is claimed is:

1. A method for operating a two-operand arithmetic pipeline in a floating-point processor system incorporating a method for safe instruction recognition for the detection of potential arithmetic overflow and underflow, comprising the steps of:
   (a) decoding of a current pipeline instruction specifying a current first and second operand and a current arithmetic operation;
   (b) fetching the current first and second operand, each of the operands comprising a sign bit, an exponent value, and a fraction value;
   (c) processing the current first and second operand exponent values to determine if the prescribed current arithmetic operation is safe by using a method for safe instruction recognition (SIR) comprising the steps of:
      (i) first range comparing of the first operand exponent value with a first range of prescribed values, producing a first output true indication if the first exponent value falls within the first prescribed range of values, otherwise producing a first output false indication;
      (ii) second range comprising of the second operand exponent value with a second range of prescribed values, producing a second output true indication if the second exponent value falls within the second prescribed range of values otherwise producing a second output false indication; and
      (iii) examining the first and second range comparing outputs, producing a true SIR output indication if both the first an second range comparing outputs are true, otherwise producing a false SIR output indication;
   (d) executing the current prescribed arithmetic operation in the two-operand arithmetic pipeline of the floating-point processor system, if step (c) produces a true SIR output indication; and
   (e) executing the current prescribed arithmetic operation in the two-operand arithmetic pipeline of the floating-point processor system while stalling the execution of a next arithmetic operation on a pair of next operands in the two-operand arithmetic pipeline of the floating-point processor system until the current prescribed operation is completed, if step (c) produces a false SIR output.

2. The method of claim 1 for operating a two-operand arithmetic pipeline further comprising the step of initiating an exception handling procedure for executing a prescribed exception handling routine if executing the current arithmetic routine results in an exception as indicated by a false SIR output.

3. The method of claim 1 for operating a two-operand arithmetic pipeline wherein the first and the second operand exponent are each a biased first and a biased second exponent respectively for providing a unipolar representation of bipolar valued exponent values by adding a bias value.

4. The method of claim 3 for operating a two-operand arithmetic pipeline wherein the steps of:
   (a) first range comparing comprises comparing of the current first operand exponent value with a prescribed first lower-limit value and with a prescribed first upper-limit value, producing a true first output indication if the first operand exponent value is equal to or greater than the first lower-limit and is also equal to or less than the first upper-limit, otherwise producing a false first output indication; and
   (b) second range comparing comprises comparing of the second operand exponent value with a prescribed second lower-limit value and with a prescribed second upper-limit value producing a true second output indication if the second operand exponent value is equal to or greater than the second lower-limit value and is also equal to or less than the second upper-limit value, otherwise producing a false second output indication.

5. The method of claim 4 for operating a two operand arithmetic pipeline wherein the prescribed limits of the first range comparing step and the second range comparing step are uncoupled so that the prescribe limits of the first range comparing step are determined independently of the second operand exponent value, and the prescribed limits of the second range comparing step are determined independently of the first operand exponent value.

6. The method of claim 4 for operating a two-operand arithmetic pipeline wherein:
   (a) the prescribed first and second lower-limit value is equal to one-half the sum of the minimum allowable biased operand exponent value plus the exponent bias value plus one; and
   (b) the prescribed first and second upper-limit value is equal to one-half the sum of the maximum allowable biased first operand exponent value plus the exponent bias value minus two.

7. The method of claim 4 for operating a two-operand arithmetic pipeline wherein the first range comparing step and the second range comparing step have equal prescribed lower limit values and equal prescribed upper limit values.

* * * * *

UNITED STATES PATENT AND TRADEMARK OFFICE
CERTIFICATE OF CORRECTION

PATENT NO. : 5,307,301
DATED : April 26, 1994
INVENTOR(S) : Jonathan B. Sweedler It is certified that error appears in the above-indentified patent and that said Letters Patent is hereby corrected as shown below:

Column 4; Line 46; Delete "/verflows"; Insert in place thereof--overflows--

Column 7; Table II; Line 14; Insert-- -2 -- following "max" Line 15, delete --2--;

Column 7; Line 20; Insert-- -1 --following "max", line 21, delete "1"

Column 7; Line 46; Delete "overflow/r"; Insert in place thereof--overflow or--

Column 12; Line 47; Delete "/f"; Insert in place thereof--of--

Signed and Sealed this

Nineteenth Day of September, 1995

Attest:

BRUCE LEHMAN

Attesting Officer

Commissioner of Patents and Trademarks